United States Patent
Kwon

(10) Patent No.: US 6,643,709 B1
(45) Date of Patent: Nov. 4, 2003

(54) DEVICE AND METHOD FOR TRANSPORTING AND CONVERTING PROTOCOL MESSAGES FROM ONE PROTOCOL INTO ANOTHER

(75) Inventor: Sang Hoon Kwon, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/494,759

(22) Filed: Jan. 31, 2000

(30) Foreign Application Priority Data

Feb. 2, 1999 (KR) .............................. 99-3433

(51) Int. Cl.[7] .............................................. G06F 15/16
(52) U.S. Cl. .................... 709/246; 709/202; 709/205; 709/230; 709/250; 370/466; 370/467; 379/219; 379/225; 379/229
(58) Field of Search ................................ 709/203–207, 709/230, 238, 242, 246, 250, 264; 370/464–469; 379/219, 220.01, 221.01, 225, 229–230

(56) References Cited

U.S. PATENT DOCUMENTS

| | | | | |
|---|---|---|---|---|
| 5,450,396 A | * | 9/1995 | Havermans | 370/465 |
| 5,483,530 A | * | 1/1996 | Davis et al. | 370/465 |
| 5,506,845 A | * | 4/1996 | Kamishima | 370/465 |
| 5,761,293 A | * | 6/1998 | Newlin et al. | 379/230 |
| 5,787,257 A | * | 7/1998 | Kusunoki | 709/242 |
| 5,818,921 A | * | 10/1998 | Vander Meiden et al. | 379/225 |
| 5,961,589 A | * | 10/1999 | Hansen | 709/205 |
| 6,301,270 B1 | * | 10/2001 | Stewart | 370/522 |

* cited by examiner

Primary Examiner—Bharat Barot
(74) Attorney, Agent, or Firm—Fleshner & Kim, LLP

(57) ABSTRACT

Device and method for transporting a protocol message, which permits PBXs (Private Branch Exchanges) connected through a PX(Public Exchange) or PX subscriber stations to transport a new protocol message between end terminals thereof through a PX, the device including a non-ISDN protocol processor for converting a message in a non-ISDN protocol data format into a message in its own protocol data format, an interfacing part for converting the message from the non-ISDN protocol processor into a message in a UUS service message format, and a UUS service part for transferring the message in the UUS service message format to a PX, thereby permitting a message transmission/reception between PBX subscribers or PX subscribers even if a communication protocol the PX gives no support.

16 Claims, 5 Drawing Sheets

DEVICE AND METHOD FOR TRANSPORTING AND CONVERTING PROTOCOL MESSAGES FROM ONE PROTOCOL INTO ANOTHER

BACKGROUND OF THE INVENTION

1. Field of the Invention

The present invention relates to protocol message transportation, and, more particularly, to device and method for transporting a protocol message, which permits PBXs (Private Branch Exchanges) connected through a PX(Public Exchange) or PX subscriber stations to transport a new protocol message between end terminals thereof through a PX.

2. Background of the Related Art

The protocol, required for communication between different devices and computers, is a set of rules required between information transportation devices so that two or more than two processors can make efficient and accurate information transportation. The protocol includes rules both for defining forms for expressing a meaningful contents both parties can understand, i.e., a form for exchanging an information, and methods for transmission/reception of the information. There are rules of different levels and different kinds from low level rules related to a hardware connection, such as RS-232C, to application levels related to user program control. Typical one that standardizes whole data communication rules is the OSI(Open System Interconnection) reference model provided by ISO, and typical one that standardizes public data network communication rules is the X series recommendation provided by the ITU(International Telecommunication Union). And, a communication rule developed for internet and used as base is the TCP/IP(Transmission Control Protocol/Internet Protocol). The non-speech communication other than the speech communication is made through the PSTN(Public Switched Telephone Network), the CSDN(Circuit Switched Data Network), the PSDN(Public Switched Data Network), and the like. However, the use of communication systems have not been convenient because an additional line should be provided every time the user intends to use a service different from each other, without permitting use of multiple services by using one line on the same time. What is provided to solve this inconvenience is the ISDN(Integrated Services Digital Network). The ISDN is a digital network which can provide various services at a time, with the services integrated. The ISDN employs a digital system because the speech telephone, the facsimile, and the TV and the like have different amounts of information and different transmission systems, with different amounts of attenuation and phases, which may cause noise or impossible to transmit if the communication is tried with only one type of communication system. However, the digital system having a bitstream of "1" and "0" can transmit.

A related art device for transporting a protocol message will be described with reference to the attached drawing. FIG. 1 illustrates a block diagram showing a related art device for transporting a protocol message.

Referring to FIG. 1, the related art device for transporting a protocol message is provided with an originating side subscriber part 10 having a first to (n)th originating side stations 11, 12, 13, and 14 for transmission and reception of speech or data calls, a first PBX 20 having a subscriber call processor 21 for processing calls originated from the originating side subscriber part, and a first to (n)th protocol processors 22, 23, 24, 25 for processing an identification number(a telephone number) of a destination side PBX or station(a telephone or computer) and a message originated from the originating side subscriber part 10 following the call processing at the subscriber call processor 21 to fit to respective protocols, and transferring to a PX 30, the PX 30 for transferring the originating side message to a second PBX 40 or one of first to (n)th PX subscriber stations 61 and 62 in the PX subscriber part 60, with reference to an identification number(or an identification number of a station) of a destination side PBX provided from the first PBX 20, the second PBX 40 for receiving the message from the PX 30 and transferring to a destination side subscriber part 50, the destination side subscriber part 50 having first to (n)th destination side stations 51, 52, 53, and 54 for receiving the message from the second PBX 40, and the PX subscriber part 60 having first to (n)th PX subscriber stations 61 and 62 directly connected to the PX 30. The second PBX 40 has a system identical to the first PBX 20. With the aforementioned related art device for transporting a protocol message, speech communications or non-speech communications(message transmission or data transmission) can be made between the first to (n)th originating side stations 11, 12, 13, 14 and the first to (n)th destination side stations 51, 52, 53, 54. In this instance, ISDN protocols are used when a speech or non-speech data is transported to the PX 30 through the subscriber call processor 21 via one suitable protocol processor among the first to (n)th protocol processors 22, 23, 24, 25. That is, in a case of packet transportation, when X.25 protocol is used, at first a packet data is produced at the originating side subscriber 11, and transfers to the subscriber call processor 21. The subscriber call processor 21 transfers the packet data to a protocol processor which processes the X.25 protocol among the first to (n)th protocol processors 25. Then, the protocol processor which processes the X.25 protocol transmits the packet data transferred from the first originating 20 side station 11 to the PX 30. The PX 30 transfers the packet data to the destination side station(for example, the first destination side station 51 through an X.25 protocol processor in the second PBX 40) desired in the originating side. Besides the X.25 protocol, the ISDN protocol supports V5.2 protocol, V.120 protocol, and the like, and the first to (n)th protocol processors 22, 23, 24, 25 process one of the protocols, such as X.25, V5.2, V.120, selectively. The communications between PBXs by using such various protocols are made available depending on the protocol respective stations can process properly. However, when it is intended to transport a new protocol message inclusive of non-ISDN protocol messages which a PX provides no support, there may be cases when the PX can not support(switch) the new protocol message inclusive of non-ISDN protocol messages, in which a private line should be provided between PBXs which are connected through a PX or between a PBX and a PX subscriber for transmission, that increases the cost.

SUMMARY OF THE INVENTION

Accordingly, the present invention is directed to device and method for transporting a protocol message that substantially obviates one or more of the problems due to limitations and disadvantages of the related art.

An object of the present invention is to provide device and method for transporting a protocol message, which permits message transmission between PBXs connected through a PX, or between a PBX and a PX subscriber by using a new protocol that the PX provides no support.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for transporting a protocol message includes a non-ISDN protocol processor for converting a message in a non-ISDN protocol data format into a message in its own protocol data format, an interfacing part for converting the message from the non-ISDN protocol processor into a message in a UUS service message format, and a UUS service part for transferring the message in the UUS service message format to a PX, thereby permitting a message transmission/reception between PBX subscribers or PX subscribers even if a communication protocol the PX gives no support.

In other aspect of the present invention, there is provided a method for transporting a protocol message, comprising the steps of converting a message in a non-ISDN protocol data format into a message in an ISDN UUS service message format, if the message in a non-ISDN protocol data format is produced at a PBX or a PX subscriber station, and transferring the message in an ISDN UUS service message format to a PX.

Thus, the present invention permits to transmit/receive a non-ISDN protocol message between PBXs using a PX or with a PX subscriber station.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
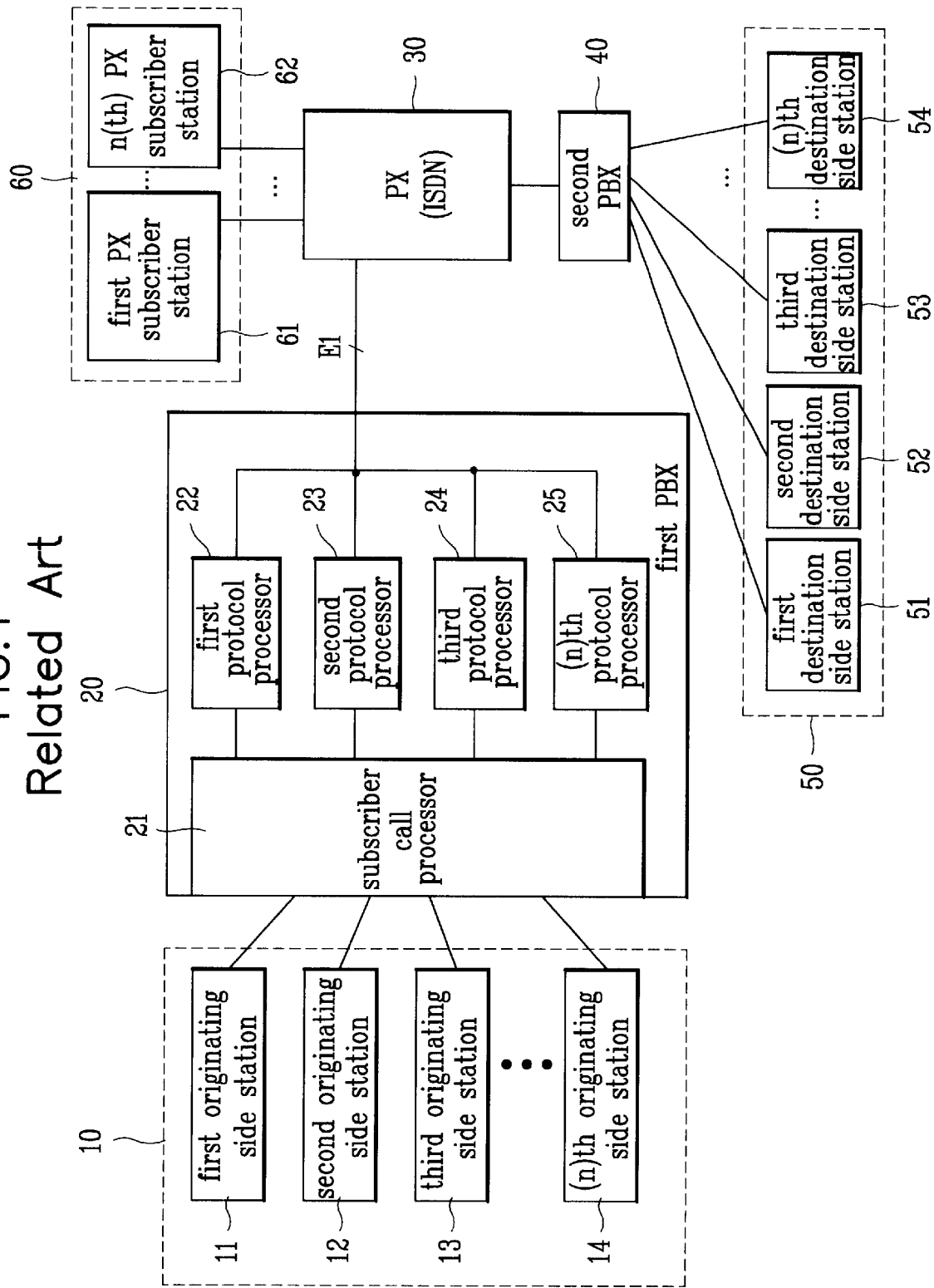
FIG. 1 illustrates a block diagram showing a related art device for transporting a protocol message.
Figure 2:
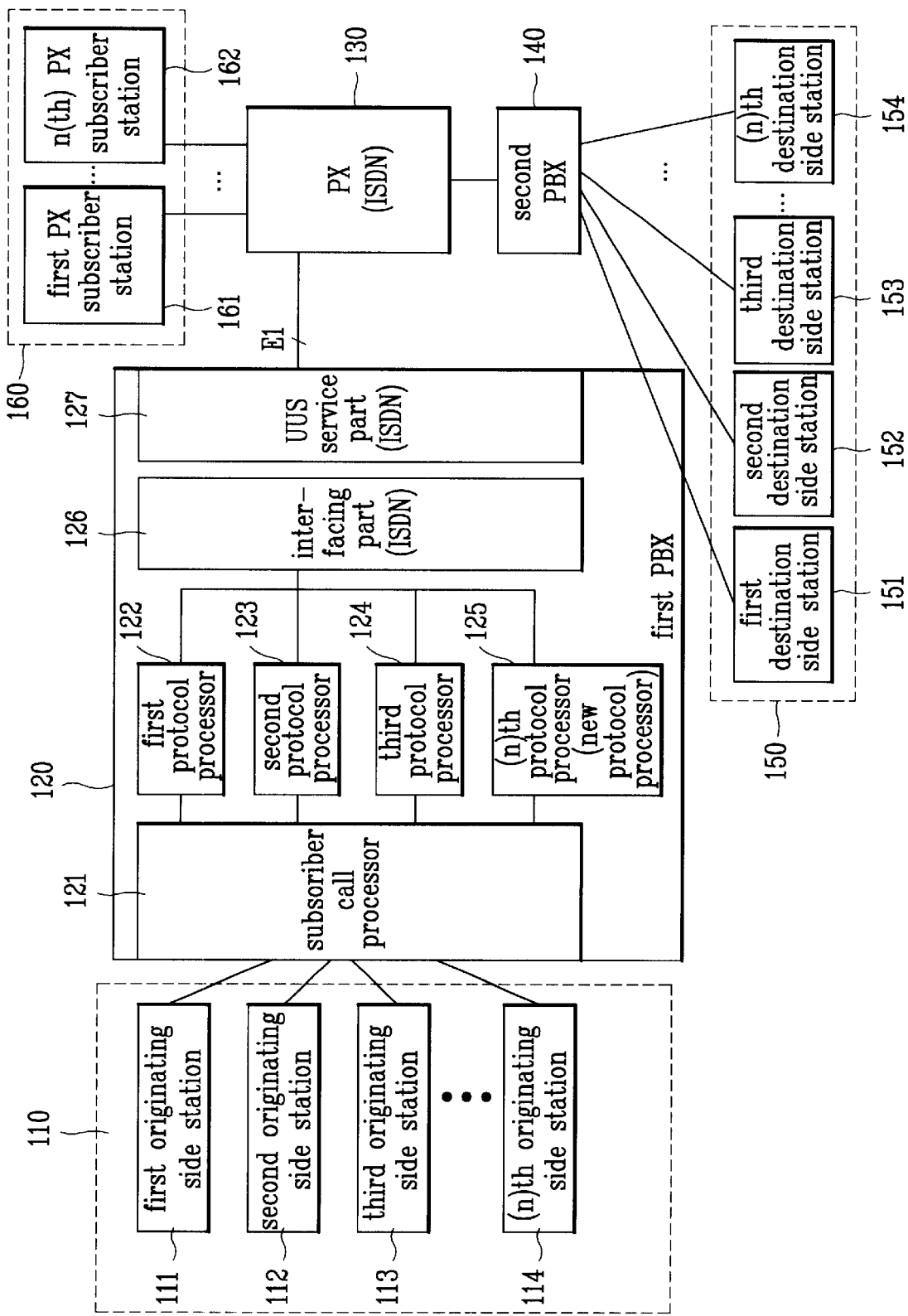
FIG. 2 illustrates a block diagram showing a device for transporting a new protocol message in accordance with a preferred embodiment of the present invention.

Reference will now be made in detail to the preferred embodiments of the present invention, examples of which are illustrated in the accompanying drawings. FIG. 2 illustrates a block diagram showing a device for transporting a new protocol message in accordance with a preferred embodiment of the present invention.

Referring to FIG. 2, the device for transporting a new protocol message in accordance with a preferred embodiment of the present invention includes an originating side subscriber part 110 having a first to (n)th originating side stations 111, 112, 113, and 114 for transmission and reception of speech or data calls, a first PBX 120 having a subscriber call processor 121 for processing calls originated from the originating side subscriber part 110, and a first to (n)th protocol processors 122, 123, 124, 125 for processing an identification number(a telephone number) of a destination side PBX or station(a telephone or computer) and a message originated from the originating side subscriber part 110 following the call processing at the subscriber call processor 121 to fit to respective protocols, an interfacing part 126 for receiving an ISDN protocol message from the first to (n)th protocol processors 122, 123, 124, and 125 and transferring the ISDN protocol message to a UUS service (User-User Signalling Service) part 127, and converting a non-ISDN protocol message, if received, into a format of a UUS service message, adding an identification number of the protocol processor that produces the non-ISDN protocol message to the UUS service message and transferring the UUS service message to the UUS service part 127, and the UUS service part 127 for transferring the ISDN protocol message or the UUS service message from the interfacing part 126 to a PX 130 by using the ISDN protocol, the PX 130 for transferring the ISDN protocol message or the UUS service message to a second PBX 140 or one of first to (n)th PX subscriber stations 161 and 162 in the PX subscriber part 160, with reference to an identification number(or an identification number of a station) of a destination side PBX from the ISDN protocol message or the UUS service message provided transferred from the first PBX 120, the second PBX 140 for receiving the ISDN protocol message or the UUS service message from the PX 130 and transferring to a destination side subscriber part 150, the destination side subscriber part 150 having first to (n)th destination side stations 151, 152, 153, and 154 for receiving the message from the second PBX 140, and the PX subscriber part 160 having first to (n)th PX subscriber stations 161 and 162 directly connected to the PX 130. The second PBX 140 has a system identical to the first PBX 120, and identical to the first PBX 120, the first to (n)th PX subscriber stations 161 and 162 in the PX subscriber part 160 also have a UUS service part using the ISDN protocol, an interfacing part, a plurality of protocol processors, and call processors. There is at least one non-ISDN protocol processor(a new protocol processor) for processing the non-ISDN protocol among the first to (n)th protocol processors 122, 123, 124, 125.

The UUS service, one of additional service functions the ISDN provides, will be described, briefly.

First, a UUS service 1 falls on a category on transmission and reception of a message related to a call set up, alerting, and a call proceeding between an originating side station and a destination side station in communication between any two stations, a UUS service 2 falls on a category on transmission and reception of a message related to disconnect, or release at a destination side during or after communication between any two stations, and a UUS service 3 falls on a category on making an actual communication after a message transmission and reception related to connect, and connect acknowledge(Ack.) between two stations after a successive proceeding of the UUS service 1. Though fee is not charged for steps of the UUS services 1 and 2 to the originating stations, fee is charged for the step of the UUS service 3 when a communication is proceeded. The UUS service is provided for user to user signalling, wherein there are D, B, and H channels used in the ISDN. The D channel is used for transmission of a service request message and a signal message between a user and a communication network, the B channel is used for transmission of speech, audio, and video signal information, and the H channel is operative at a bit rate higher than the B channel, though the H channel has the same function as the B channel. In order to have the UUS service at a station(for example, a telephone) connected to a PBX or a PX, after a UUS service button on the station is pressed, a key pad on the telephone should be pressed for making a communication. For example, during communication between users, the D channel may be used for transferring a bank account number, a resident registration number, or a pass word to the other party.

Figure 3:
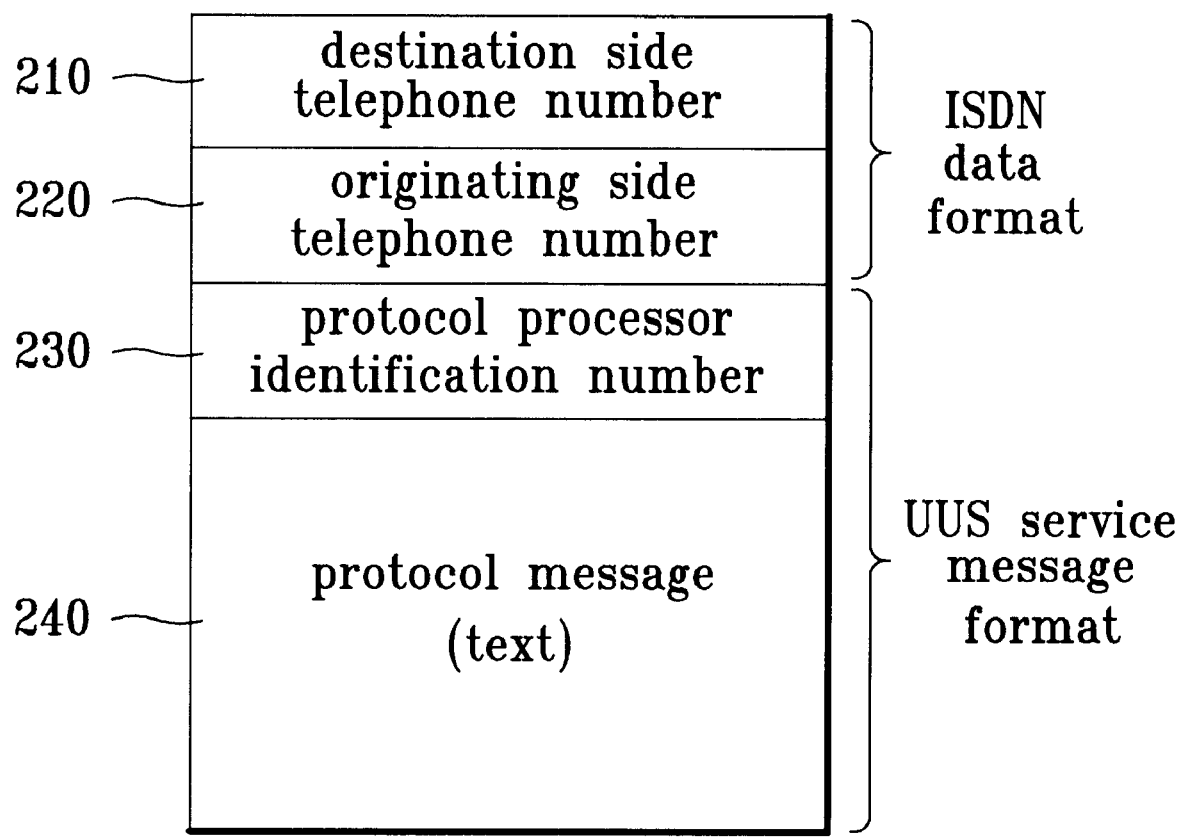
FIG. 3 illustrates a new protocol message data format in accordance with a preferred embodiment of the present invention.
Figure 4:
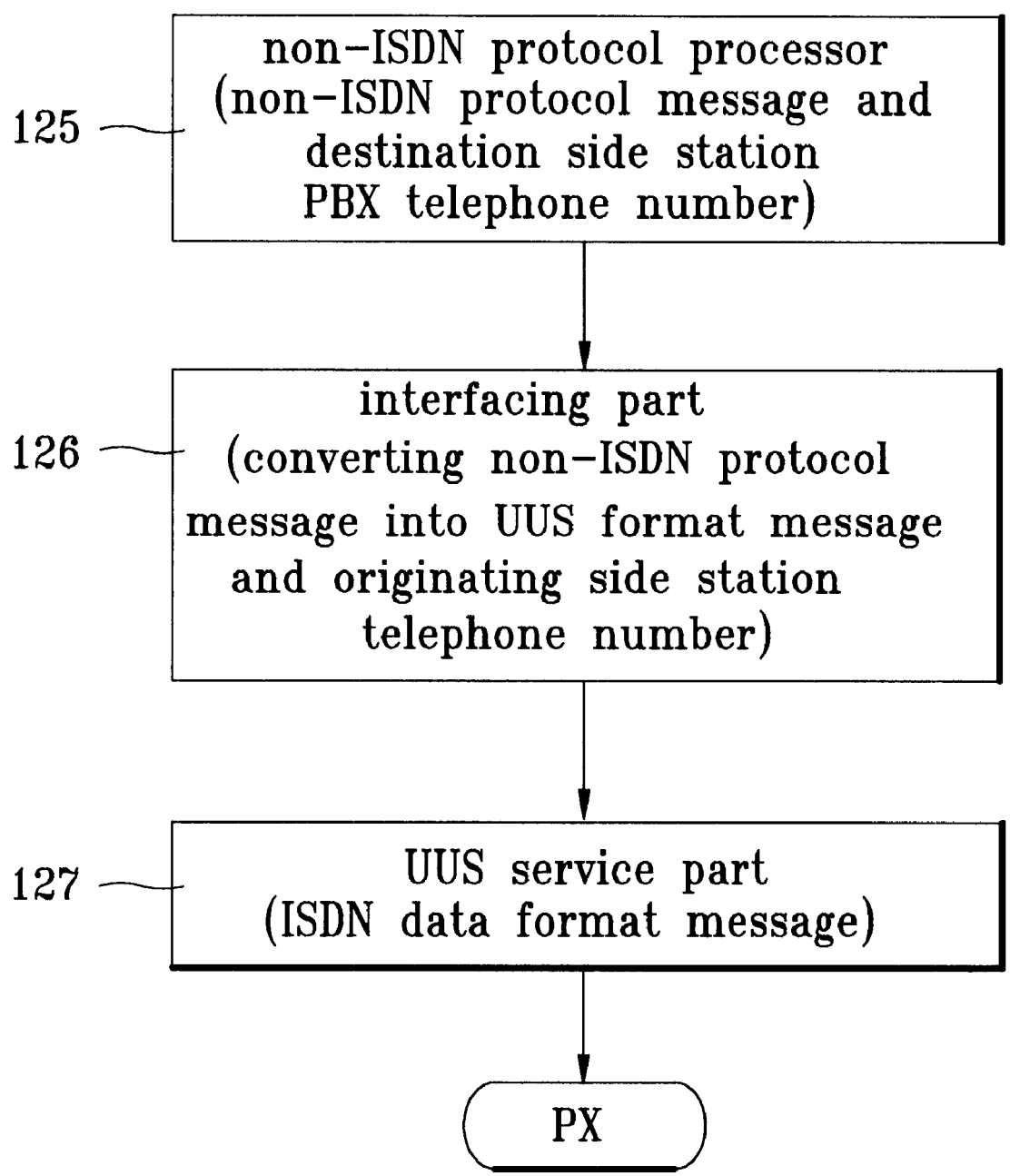
FIG. 4 illustrates a flow chart showing a procedure of a message transmission by using a device for transporting a new protocol message in accordance with a preferred embodiment of the present invention; and, FIG. 5 illustrates a flow chart showing flow of a signalling service between stations by using the device for transporting a new protocol message in accordance with a preferred embodiment of the present invention.

FIG. 3 illustrates a new protocol message data format in accordance with a preferred embodiment of the present invention, and FIG. 4 illustrates a flow chart showing a procedure of a message transmission by using a device for transporting a new protocol message in accordance with a preferred embodiment of the present invention.

Referring to FIG. 3, the new protocol message data format in accordance with a preferred embodiment of the present invention includes an ISDN data format and an ISDN UUS service message format. And, the ISDN data format has a destination side telephone number 210 and an originating side telephone number 220(when a response from the originating side or identification is required), and the UUS service message format has a protocol processor identification number 230 and a protocol message 240 which is a text. The protocol message 240 is a non-speech data. For example, when the first and the second PBXs 120 and 140 intend to make a non-ISDN protocol communication which can be interpreted by both parties, or when the PX subscriber station 161 and 162 intends to transfer a non-ISDN protocol message to the destination side by using the UUS function in the PX 130, the new protocol message data format is used. Upon reception of one code(for example '*33' of the telephone) from one of the first to (n)th originating side stations 111, 112, 113, 114(for example, a telephone of a PBX subscriber) in a format set in advance between the first PBX 120 and the first to (n) originating side stations 111, 112, 113, and 114, the subscriber call processor 121 requests the (n)th protocol processor 125 for a service, which can process a message of the non-ISDN protocol data format. The (n)th protocol processor 125 converts the code from the subscriber call processor 121 into a message format of the (n)th protocol processor 125, and transfers the converted message format and the destination side telephone number to the interfacing part 126. The interfacing part 126 converts a message format of the (n)th protocol processor 125 into the UUS format message, and transfers the UUS format message including the identification number (230 in FIG. 3) of the (n)th protocol processor 125 to the UUS service part 127. Then, the UUS service part 127 transfers the UUS format message to the PX 130 by using the destination side telephone number. The PX 130 then transfers the UUS format message either to the PX subscriber station or the PBX, and the non-ISDN protocol processor in the destination side PX subscriber station or in the PBX converts the message transferred from the PX 130 into the code produced at the originating side station, initially.

Figure 5:
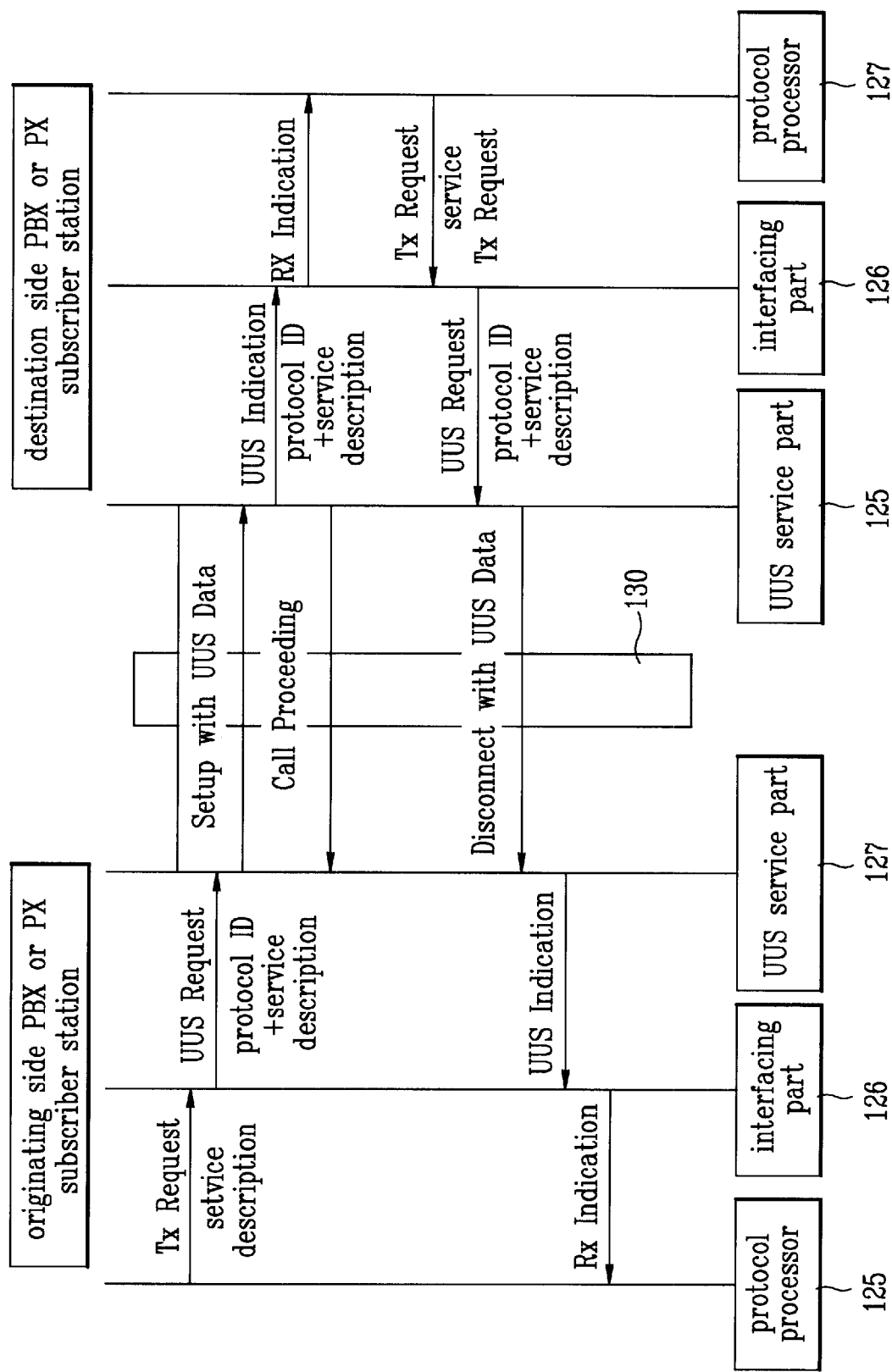

FIG. 5 illustrates a flow chart showing flow of a signalling service between users by using the device for transporting a new protocol message in accordance with a preferred embodiment of the present invention. The signalling service between users by using the device for transporting a new protocol message will be explained with reference to FIGS. 5 and 2.

Upon reception of one code from the first originating side station 111 among the first to (n)th originating side stations 111, 112, 113, 114 in the originating side subscriber part 110, which can provide speech or non-speech communication service, in a format set in advance between the first PBX 120 and the first to (n) originating side stations 111, 112, 113, and 114, the subscriber call processor 121 transfers the code to the (n)th protocol processor 125(called as a non-ISDN protocol processor 125, hereafter) which can process a message of the non-ISDN protocol data format. The non-ISDN protocol processor 125 converts the received code into its own data format, and transfers to the interfacing part 126. The interfacing part 126 receives the non-ISDN protocol format message converted at the non-ISDN protocol processor 125 and converts into the UUS service data format. The UUS service data format is a text. Then, the new protocol message(see FIG. 3) inclusive of the UUS message having the converted UUS service data, the identification number of the originating side station, and the identification number of the non-ISDN protocol processor 125 is transferred to the UUS service part 127. The UUS service part 127 having the new protocol message received inclusive of the UUS message transfers a call setup message to the PX 130 by using the UUS service 1 function. The PX 130 transfers the message and a call setup message to the second PBX 140 or one of the first to (n)th PX subscriber stations 161 and 162 in the PX subscriber part 160, with reference to an identification number(or an identification number of a station) of a destination side PBX from the new protocol message. or the UUS service message transferred from the UUS service part 127. In this instance, the second PBX 140 receives the new protocol message and the call setup message from the PX 130 and transfers to the destination side subscriber part 150. The second PBX 140 also has the same system as the first PBX 120. Accordingly, the UUS service part 147 in the second PBX 140 transfers the UUS data format message from the call setup message and the new protocol message from the first PBX 120 to the interfacing part 146 in the second PBX 140. In this instance, the UUS service part 147 in the second PBX 140 transfers a call proceeding message to the UUS service part 127 in the first PBX 140. Then, the interfacing part 146 in the second PBX 140 transfers the identification number of the non-ISDN protocol processor 125 and the UUS service message from the UUS service data format message to the non-ISDN protocol processor in the second PBX 140. And, the interfacing part 146 in the second PBX 140 determines the UUS service message of being a message for setting up a communication path from the telephone number of the destination station, and provides a disconnect message and a call release message to the first PBX 120 by using the UUS service 2 if the UUS service message is not for placing communication. That is, if a particular telephone number is setup between the first and second PBXs 120 and 140 and the first and second PX subscriber stations 161 and 162, for the message transmission, it can be known that the UUS service message is a call setup message for placing a call or not. The non-ISDN protocol processor 145 in the second PBX 140 converts the received UUS service message into a form of initial originating side message, and transfers to a station(for example, the first destination side station 153) by referring to the destination side station number. Accordingly, since the non-ISDN protocol message can be transferred between the originating side and the destination side without using the ISDN UUS service 3, it is not necessary to occupy a device speech channel, and no fee will be charged. And, if the protocol processor, the interfacing part, and the UUS service part for processing the new protocol is provided to the first to (n)th PX subscriber stations 161 and 162 in the PX subscriber part 160, the first to (n)th PX subscriber stations 161 and 162 also can receive the non-ISDN protocol from the first to (n)th originating side stations 113 and 114. If the aforementioned procedure is employed, a message can be transferred from end to end of PBXs and stations by using the ISDN UUS without an additional interfacing device or development of a protocol. The ISDN hardware interface used in the present invention is applicable both to the BRI(Basic Rate Interface)(between a PX subscriber and a PX) and the PRI(Primary Rate Interface)(between a PBX and a PX) defined in the 1400 series recommendations in the ITU-T(ITU-Telecommunication Standardization Sector).

As has been described, the device and method for transporting a protocol message of the present invention permits to transport a new non-ISDN protocol message which a PX can not support to PBXs connected through the PX or PX subscriber stations, thereby permitting transportation of the new non-ISDN protocol message without using a private line, that makes proper services of the PBX as well as a variety of application at a station which can support the ISDN protocol available.

It will be apparent to those skilled in the art that various modifications and variations can be made in the device and method for transporting a protocol message of the present invention without departing from the spirit or scope of the invention. Thus, it is intended that the present invention cover the modifications and variations of this invention provided they come within the scope of the appended claims and their equivalents.

What is claimed is:

1. A device for transporting a protocol message comprising:
    a non-ISDN protocol processor for converting a message in a non-ISDN protocol data format into a message in its own protocol data format;
    an interfacing part for converting the message from the non-ISDN protocol processor into a message in a User to User Signaling (UUS) service message format; and
    a UUS service part for transferring the message in the UUS service message format to a Private Exchange (PX).

2. A device as claimed in claim 1, wherein the non-ISDN protocol processor, the interfacing part, and the UUS service part are included in a Private Branch Exchange (PBX) and Private Exchange (PX) subscriber station, respectively.

3. A device as claimed in claim 2, wherein the PBX includes a subscriber call processor between the non-ISDN protocol processor and a PBX subscriber station.

4. A device as claimed in claim 2, wherein there is at least one non-ISDN protocol processor.

5. A device as claimed in claim 1, wherein the message in the UUS service message format includes an originating side identification number, a destination side protocol processor identification number, and the protocol message.

6. A device as claimed in claim 5, wherein the message in the UUS service message format further includes an originating side station identification number.

7. A device as claimed in claim 6, wherein the destination side identification number and the originating side identification number are included in an ISDN data format, and the originating side protocol processor identification number and protocol message are included in the UUS service message format.

8. A method for transporting a protocol message comprising:
    converting a message in a non-ISDN protocol data format into a message in an ISDN UUS service message format, if the message in a non-ISDN protocol data format is produced at a PBX or a PX subscriber station;
    converting a message in a non-ISDN protocol data format into a message in its own protocol data format if required to support communication; and
    transferring the message in an ISDN UUS service message format to a PX.

9. A method as claimed in claim 8, wherein the PBX transfers the ISDN UUS service message to the PX, together with an originating side station identification number.

10. A method as claimed in claim 9, wherein the PBX transfers the ISDN UUS service message and the originating side station identification number to the PX, together with a call setup message by using an ISDN UUS service 1.

11. A method as claimed in claim 10, wherein, when the call service message is transferred by using the ISDN UUS service 1, the destination side station provides a call release message to the originating side PBX by using an ISDN UUS service 2 after the destination side station receives the ISDN UUS service message.

12. A method for transporting a protocol message by using a PBX or a PX subscriber station having a non-ISDN protocol processor, an interfacing part, and a UUS service part, comprising:
    (1) the non-ISDN protocol processor converting a message in a non-ISDN protocol data format into a message in a protocol message format for a destination side PBX or the PX subscriber station;
    (2) the interfacing part converting the protocol message into a message in an ISDN UUS service message format; and
    (3) the UUS service part transferring the ISDN UUS service message to a PX.

13. A method as claimed in claim 12, wherein the interfacing part transfers the ISDN UUS service message to the UUS service part, together with an identification number of a non-ISDN protocol processor.

14. A method as claimed in claim 12, wherein the UUS service part transfers the ISDN UUS service message to the PX, together with a call setup message by using an ISDN protocol UUS service 1.

15. A method as claimed in claim 12, further comprising:
    the PX transferring the ISDN UUS service message to a destination side station;
    the destination side station transferring a call release message to the PX by using an ISDN protocol UUS service 2;
    the PX transferring the call release message to the interfacing part in the originating side PBX after the step (3).

16. A method as claimed in claim 12, after the step (3), further comprising:
    the PX transferring the UUS service message to a UUS service part in the destination side PBX or the PX subscriber station;
    the destination side UUS service part transferring the UUS service message to the interfacing part in the destination side PBX or in the PX subscriber station;

the destination side interfacing part converting the UUS service message into a message format of the destination side non-ISDN protocol processor;

the interfacing part transferring the converted non-ISDN protocol message to the non-ISDN protocol processor in the destination side PBX or PX subscriber station; and the destination side non-ISDN protocol processor converting the non-ISDN protocol message into a data format for the destination side PBX or PX subscriber station, and transferring to a call processor in the destination side PBX or in the PX subscriber station.

* * * * *